US008600545B2

(12) United States Patent
Earlam

(10) Patent No.: US 8,600,545 B2
(45) Date of Patent: Dec. 3, 2013

(54) SYSTEM AND METHOD FOR INSPECTING AND SORTING PARTICLES AND PROCESS FOR QUALIFYING THE SAME WITH SEED PARTICLES

(75) Inventor: Matthew R. Earlam, Henderson, NV (US)

(73) Assignee: Titanium Metals Corporation, Exton, PA (US)

( * ) Notice: Subject to any disclaimer, the term of this patent is extended or adjusted under 35 U.S.C. 154(b) by 335 days.

(21) Appl. No.: 12/975,774

(22) Filed: Dec. 22, 2010

(65) Prior Publication Data

US 2012/0165973 A1 Jun. 28, 2012

(51) Int. Cl.
*G06F 7/00* (2006.01)
*G01B 5/28* (2006.01)

(52) U.S. Cl.
USPC ............. 700/223; 700/222; 700/228; 702/35; 702/38

(58) Field of Classification Search
None
See application file for complete search history.

(56) References Cited

U.S. PATENT DOCUMENTS 4,807,762 A 2/1989 Illy et al.
4,975,364 A 12/1990 Taylor et al.
5,090,576 A 2/1992 Menten
5,335,293 A 8/1994 Vannelli et al.
5,519,225 A 5/1996 Mohr et al.
5,533,628 A 7/1996 Tao
5,676,256 A 10/1997 Kumar et al.
5,799,105 A 8/1998 Tao
5,924,575 A 7/1999 Gigliotti, Jr. et al.
6,043,445 A * 3/2000 Gigliotti et al. ............... 209/580
6,103,299 A * 8/2000 Shimamune et al. ...... 427/126.3
6,172,748 B1 1/2001 Sones et al.
6,238,738 B1 5/2001 McCurdy
6,600,829 B1 7/2003 Affeldt et al.

(Continued)

FOREIGN PATENT DOCUMENTS

EP 0574831 9/1999
JP 63157044 6/1988

(Continued)

OTHER PUBLICATIONS

Swanson, et al. in "A Real-Time Coal Content/Ore Grade (C2OG) Sensor," published online at http://www.osti.gov/energycitations/product.biblio.jsp?osti_id=791709 in Apr. 2005.

(Continued)

*Primary Examiner* — Yolanda Jones
(74) *Attorney, Agent, or Firm* — Locke Lord LLP; Peter J. Fallon

(57) ABSTRACT

A method for qualifying an automated process for inspecting and sorting particles through the production and use of seed particles is disclosed. In one embodiment, seed particles are produced by forming a conformal surface layer on a plurality of particles, thereby imparting them with at least one property whose value or range of values is the same as or about the same as a value or range of values of a corresponding property of undesirable particles. By introducing a predetermined quantity of seed particles, their detection and removal by the automated sorting system can be used to periodically calibrate and qualify the sorting system without interrupting the manufacturing operations or introducing actual undesirable particles into the process stream. The production and use of seed particles to qualify an automated sorting system is particularly well-suited for use with Ti sponge sorting operations.

6 Claims, 7 Drawing Sheets

(56) References Cited

U.S. PATENT DOCUMENTS

| | | | | |
|---|---|---|---|---|
| 6,798,515 | B1 | 9/2004 | Bachelder et al. | |
| 6,816,794 | B2 * | 11/2004 | Alvi | 702/35 |
| 2006/0093737 | A1 * | 5/2006 | Dick et al. | 427/180 |
| 2009/0032441 | A1 | 2/2009 | Corak et al. | |
| 2009/0050540 | A1 | 2/2009 | Imai et al. | |
| 2009/0308133 | A1 | 12/2009 | Merchant et al. | |
| 2010/0143906 | A1 | 6/2010 | Becker et al. | |
| 2011/0079544 | A1 | 4/2011 | Hunter et al. | |

FOREIGN PATENT DOCUMENTS

| | | |
|---|---|---|
| JP | 8015031 | 1/1996 |
| WO | WO 97/09689 | 3/1997 |
| WO | WO 00/50181 | 8/2000 |
| WO | WO 2009/019605 | 2/2009 |

OTHER PUBLICATIONS

Weldon Solutions brochure on "Quality Control Robot for Removal of Metal Impurities," published online at http://www.weldonmachinetool.com/downloads/profiles-fall09.pdf in the Fall of 2009.

P.H. Heinemann in "Machine Vision Inspection of 'Golden Delicious' Apples," Applied Engineering in Agriculture, vol. 11, No. 6, pp. 901-906 (1995).

Y. Tao, et al. in "Machine Vision for Color Inspection of Potatoes and Apples," Transactions of ASAE, vol. 38, No. 5, pp. 1555-1561 (1995).

Tom Pearson in "Machine Vision System for Automated Detection of Stained Pistachio Nuts," SPIE, vol. 2345, pp. 95-103 (1995).

J.-L. Delplancke, et al. in "Self-Colour Anodizing of Titanium," Surface Technology, 16 pp. 153-162 (1982).

A. Rosenfeld, et al. in "Sorting of Aluminum Alloy Scrap by Laser Induced Optical Emisssion Spectroscopy," Third International Symposium on Recycling of Metals and Engineered Materials, Edited by P.B. Queneau and R.D. Peterson, The Minerals, Metals & Materials Society, pp. 751-763 (1995).

Key Technology, Inc. article entitled "Understanding How Electronic Sorting Technology Helps Maximize Food Safety," published online at http://www.key.net/files/downloads/how-electronic-sorting-technology-helps-max-food-safety.pdf in Jun. 2010.

PCT Notification of Transmittal of the International Search Report and the Written Opinion of the International Searching Authority, or the Declaration dated May 3, 2012 corresponding to International Application No. PCT/US11/66803.

* cited by examiner

Key:

O6b: Optyx 6 mesh blue
O7g: Optyx 7 mesh gold
O6b: Optyx 8 mesh blue
O8r: Optyx 8 mesh red/brow
O12b: Optyx 12 mesh blue

SYSTEM AND METHOD FOR INSPECTING AND SORTING PARTICLES AND PROCESS FOR QUALIFYING THE SAME WITH SEED PARTICLES

BACKGROUND OF THE INVENTION

I. Field of the Invention

This invention relates generally to a process for sorting particles. In particular, the present invention relates to a process for qualifying an automated system for inspecting and sorting particles by introducing a predetermined number of seed particles into the process stream. This invention also relates to the production and qualification of seed particles having at least one property whose value or range of values is the same as or about the same as a value or range of values of a corresponding property of known undesirable particles.

II. Background of the Related Art

Conventional mining and/or metal processing operations can involve an intermediate stage wherein fragments or particles of the desired ore or metal are transported along a moving surface for visual inspection and the removal of undesired impurities. Removal of impurity fragments or particles is important for applications in which tight elemental concentration tolerances are necessary to ensure that the material properties of the finished product are suitable for their intended use. In many cases, such impurities will have an appearance that is clearly distinct from standard ore or metal particles having the targeted composition, thereby enabling their visual identification and removal by human operators.

Titanium (Ti) is an example of a material which, for applications involving highly stressed components, requires visual inspection and sorting during production. Commercial processes, which are used to extract Ti from $TiO_2$ and/or $TiCl_4$, produce a sponge-like material known as Ti sponge which is then consolidated into the desired shape by remelting. Under certain conditions, the production of Ti sponge results in the formation of sponge particles which have been "burned" and subsequently converted to titanium oxide or titanium nitride. The incorporation of nitrided Ti sponge particles during remelting is undesirable because if they survive the melting phase their presence in the finished metal, alloy or manufactured product can lead to the formation of hard alpha material or low density inclusions. These inclusions, if undetected by various quality checks, can impact the effectiveness of the manufactured article. Nitrided or oxidized Ti sponge particles have an appearance which is distinctly different from that of normal Ti sponge, being a darker shade of color which is readily discernible to the naked eye. This distinction permits the identification of the undesired particles and their removal from the process stream by a human operator.

Current industry standards generally require that the Ti sponge used to fabricate certain end use components be subject to 100% visual inspection. However, the use of individual operators to inspect and sort the process stream can be a time consuming, labor-intensive and costly process since the moving surface typically must move slowly to facilitate inspection and removal of undesired particles by human operators.

Recent approaches to modernizing sorting processes have involved the implementation of automated sorting systems which are capable of automatically inspecting and sorting particles in a process stream. An example of such a system is set forth in U.S. Pat. No. 6,043,445 to Gigliotti, et al. (hereinafter "Gigliotti") which is directed to an apparatus for color-based sorting of titanium sponge particles. In one embodiment, Gigliotti discloses the use of an imaging device to capture a color image of the product as it is transported on a moving surface. The image is converted to a color signal and is sent to a central processing unit where the signal is transformed to a color value. This color value is then compared to a look-up table which defines acceptable threshold levels. If the color value is identified as being outside an acceptable range, then the system identifies particles having this color value as undesirable product and signals for their removal from the process stream. The rejected particles may be removed by correlating their movement along the moving surface with image acquisition such that the location of the rejected particles can be precisely identified and their removal effectuated by physical means.

An analogous automated system which is capable of sorting scrap metal particles based upon their color has been disclosed by U.S. Pat. No. 5,676,256 to Kumar, et al. ("Kumar"). Yet another approach to automated inspection is provided by U.S. Pat. No. 5,519,225 to Mohr, et al. ("Mohr") which describes the use of radiographic inspection methods to examine particles in a process stream. Mohr discloses the use of a dual radiation source to alternatively irradiate particles in the process stream with neutrons and X-rays or gamma rays and a dual modality gas ionization detector to detect the radiation after it has passed through the particles. The detected radiation is processed and displayed on a monitor, enabling objects formed with different attenuating materials to be distinguished. The Gigliotti, Kumar, and Mohr patents are incorporated by reference in their entirety as if fully set forth in this specification.

Despite the cost savings and improved sorting capabilities attainable through the use of automated inspecting and sorting systems, there has been considerable resistance to their widespread adoption primarily due to uncertainties associated with the accuracy, reliability and qualification of these systems. For example, the performance of automated inspecting and sorting systems may deviate from the norm due to issues such as nonuniform illumination of the particles, errors occurring during image acquisition and/or mechanical problems during sample transport.

In addition, repeated verification and calibration of automated sorting systems is typically necessary to ensure that the sorting process is functioning properly. These processes can result in significant down time since they typically require that the process flow be stopped so that calibration procedures may be performed without inadvertently allowing undesirable particles to pass through the system and be introduced into the manufactured article. There is therefore a continuing need for the development of automated inspecting and sorting systems which have improved consistency and reliability, operate at reduced cost and can be accurately verified and calibrated with minimal interruption of the process flow.

SUMMARY OF THE INVENTION

In view of the above-described problems, needs, and goals, systems and methods of qualifying an automated inspecting and sorting system using seed particles are disclosed. In one embodiment a method of forming and qualifying seed particles for use in automated inspecting and sorting systems is provided. In a particular embodiment, the seed particles are formed by initially producing a plurality of particles having a predetermined shape and size distribution. A conformal surface layer is then formed on the particles to produce seed particles and thereby impart to the seed particles at least one property with a value or range of values that is the same as or about the same as a value or range of values of a corresponding property of undesirable particles. A plurality of the seed particles are added to a process stream comprising the plurality of particles which is processed by the automated inspecting and sorting system. The automated inspecting and sorting system is programmed to detect and selectively remove from the process stream those seed particles having a predetermined property value or range of property values. The seed particles which are detected and removed from the process stream are retained and used to qualify the automated inspecting and sorting system itself during standard startup and operating conditions.

In some embodiments, metal particles are used having an average diameter of about 2 mm, about 3 mm or about 4 mm. The conformal surface layer formed on the metal particles may be produced using deposition processes which include, but are not limited to at least one of anodization, electroplating, chemical vapor deposition, physical vapor deposition and painting. The deposition of a conformal surface layer produces seed particles having at least one property with a value or range of values that is the same as or about the same as a value or range of values of a corresponding property of undesirable particles. In one embodiment, the conformal surface layer provides the seed particles with a color or range of colors which is the same or about the same as a corresponding color value or range of color values of the undesirable particles. In a particular embodiment, the conformal surface layer is formed using a material which does not adversely affect the properties of products manufactured from the particles. In some embodiments, the seed particles that are not rejected are reintroduced to the automated inspecting and sorting system.

In another particular embodiment, the particles are comprised of Ti sponge, the undesirable particles are comprised of nitrided Ti sponge and the seed particles are comprised of Ti sponge, wherein the surface of the seed particles is coated with a conformal layer of a material having at least one property with a value or range of values that is the same as or about the same as a value or range of values of a corresponding property of nitrided Ti sponge. In an even more particular embodiment, the seed particles are comprised of Ti sponge particles having a conformal surface layer of titanium oxide formed thereon. The thickness of the titanium oxide layer may be adjusted to provide the seed particles with a color or range of colors that are the same or about the same as a corresponding color value or range of color values of nitrided Ti sponge. In some embodiments, the color value or range of color values of the coated seed particles is gold, yellow, brown, black, blue, red, violet, or shades and/or combinations of these colors.

In another embodiment, a method for qualifying an automated system for inspecting and sorting particles, seed particles and undesirable particles is provided. The method involves producing seed particles having at least one property with a value or range of values that is the same as or about the same as a value or range of values of a corresponding property of undesirable particles and calibrating the system to identify or distinguish between particles, seed particles and undesirable particles according to a predetermined property value or range of property values. A predetermined quantity of the seed particles are introduced to a process stream comprising a plurality of particles and undesirable particles and the process stream is monitored as it is transported along a moving surface. The seed particles and undesirable particles present in the process stream are identified and then removed from the process stream. It is then determined whether the number of seed particles removed is equal to the predetermined quantity of seed particles which were introduced to the process stream, and the system is recalibrated to maximize the removal of undesirable particles from the process stream based upon the determining result.

In another embodiment, the present invention relates to a metal produced from metal particles which have been inspected using an automated system for inspecting and sorting metal particles which has been qualified using seed particles. In a particular embodiment, the metal comprises Ti produced from Ti sponge which has been sorted using an automated inspecting and sorting system that has been qualified using Ti seed particles. In yet another embodiment, the present invention relates to a manufactured product formed from a metal produced from metal particles which have been inspected using an automated system for inspecting and sorting metal particles that has been qualified using seed particles.

In yet another embodiment, a system for inspecting and sorting particles, seed particles and undesirable particles is disclosed. In a particular embodiment, the system comprises a plurality of particles having a predetermined shape and size distribution, wherein a conformal surface layer is formed on a plurality of the particles to produce seed particles having at least one property whose value or range of values is the same as or about the same as a value or range of values of a corresponding property of an undesirable particle; a process stream comprising particles, seed particles and undesirable particles to be inspected and sorted; and a first automated inspecting and sorting apparatus.

An embodiment of the first automated inspecting and sorting apparatus comprises a feeder for introducing a process stream into the apparatus at a predetermined feed rate, a moving surface for transporting the process stream through the system, a lamp for illuminating the process stream as it is transported along the moving surface, a camera for acquiring images of the process stream, a device for analyzing images acquired by the camera and comparing the images with a pre-determined range of values for particles, seed particles and undesirable particles, and an air ejector for removing seed particles and undesirable particles from the process stream. In a particular embodiment the seed particles and undesirable particles which are removed from the process stream by the system for inspecting and sorting particles are sent back to the feeder.

In one embodiment, the system for inspecting and sorting particles, seed particles and undesirable particles comprises a second automated inspecting and sorting apparatus. In this embodiment, seed particles and undesirable particles that were removed from the process stream by the first automated inspecting and sorting apparatus are inspected and sorted by the second automated inspecting and sorting apparatus. In another particular embodiment, the feed rate of the first automated inspecting and sorting apparatus is higher than the feed rate of the second automated inspecting and sorting apparatus.

The production of seed particles and their use to qualify an automated system for inspecting and sorting particles provide a means for quickly and reliably ensuring that such sorting systems are functioning according to their intended use. The use of seed particles to qualify an automated inspecting and sorting system has the advantage of providing a more accurate, efficient, and cost-effective sorting system which, in turn, provides increased confidence that the sorted product contains fewer undesirable particles than that inspected by a human operator.

BRIEF DESCRIPTION OF THE DRAWINGS

The accompanying drawings, which are incorporated into and constitute part of this disclosure, illustrate exemplary embodiments of the disclosed invention and serve to explain the principles of the disclosed invention.

Figure 1:
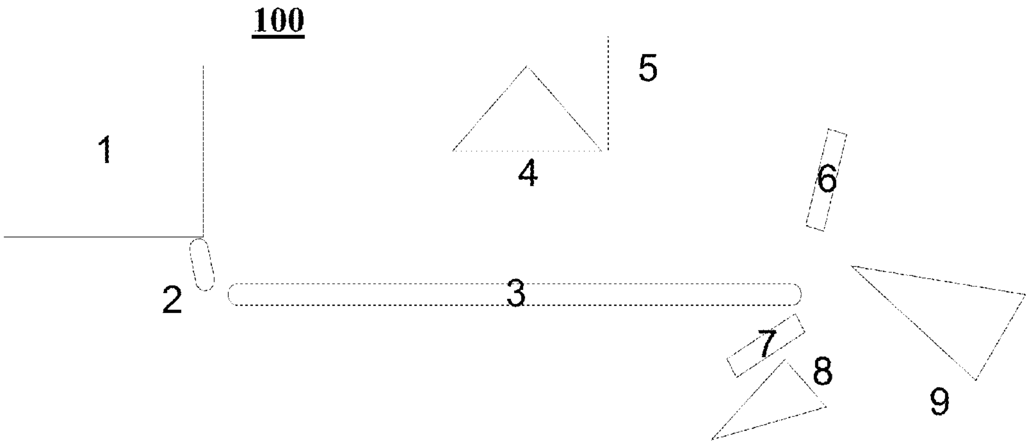
(PRIOR ART) Fig. 1
FIG. 1 is a schematic showing the components of an exemplary automated inspecting and sorting system.

Throughout the drawings, the same reference numerals and characters are used to denote like features, elements, components or portions of the illustrated embodiments unless otherwise stated. While the disclosed invention is described in detail with reference to the figures, it is done so in connection with the illustrative embodiments.

DETAILED DESCRIPTION OF THE INVENTION

Exemplary methods for qualifying an automated inspecting and sorting system using seed particles are disclosed. Embodiments of methods for producing and qualifying the seed particles themselves are also disclosed. The production of seed particles having at least one property whose value or range of values is the same as or about the same as a value or range of values of a corresponding property of undesirable particles permits their use as mock undesirable particles in an actual process stream which is subject to an automated inspecting and sorting system. By using seed particles as mock undesirable particles, the system itself can be periodically qualified by introducing a predetermined quantity of seed particles at random intervals during actual operation of the system. An analysis of whether these particles were detected by the system can be used to verify and fine-tune the inspecting and sorting process.

Within this specification, a property of the particles is understood to be any material property which includes, but is not limited to, the size, shape, density, surface texture, color, or composition of the particles. Furthermore, each property can be assigned a given value. For example, and not to be limiting, a property value for size or shape may include the numerical value of one or more external dimensions, a property value for the density would be a measurement of mass per unit volume, a property value for color may include a particular color, a HEX value, or RGB value, a property for surface texture may include smooth, rough, or jagged and the property value of composition may include the type and amounts of the elemental constituents of the particle. In some embodiments one or more properties of the particles may be measured using, for example, an image acquisition device such as a camera or through specialized techniques such as optical emission spectroscopy (OES) or X-ray fluorescence (XRF). It is to be understood that any reference to a "property of an undesirable particle" within this specification refers to the specific value of the property which is distinguishable from the value of an acceptable particle.

The seed particles may be produced using a material which, if it were to inadvertently pass through the inspection system and be incorporated into the final product, does not have an undesirable effect on the properties of the resulting product. Use of an acceptable material to produce the seed particles permits introduction of the seed particles directly into an actual production line so that periodic qualification of the sorting system can be performed during system start-up or actual sorting operations. The use of seed particles is particularly advantageous when used with processes which sort metal particles and/or their ores since it frequently is the case that variations in composition are readily visible as differences in color, structure, or some other visual property of the metal or ore. By identifying this distinction either by use of human operators or with an automated inspecting and sorting system, undesirable particles can be removed from the process stream.

Since the characteristics of undesirable particles are known, a property that does not have an undesirable impact on the performance of the particles can be deliberately imparted to known acceptable particles which then serve as seeds that are used to test the inspecting sorting capabilities of the system. For example, if the undesirable particles have a color which is distinct from that of particles having the desired composition, a thin conformal layer can be formed on one or more particles such that they take on the color of a undesirable particle. Within this specification a conformal layer is defined as a surface layer which is applied to or formed upon all exposed surfaces of a particle such that it covers substantially the entire exterior of the particle. In a particular embodiment, the entire surface of the particle is covered such that no uncoated regions are visible; however, a completely covered surface is not a necessary criteria. In alternative embodiments, the particle may be provided with a surface coating which covers a fraction of the exposed surface area sufficient to provide the particle with a color which is the same or about the same as undesirable particles and permits its detection by the automated inspecting and sorting system. In one embodiment, the fraction of the particle's surface that is covered by a surface coating ranges from about 80% up to about 100% of the exposed surface area.

The color of a seed particle is determined to be the same as that of an undesirable particle when the color shade or value of the seed particle identified by the automated inspecting and sorting system is the same or about the same as the color shade or value of the undesirable particle. That is, a seed particle and undesirable particle are determined to have the same color when, after being imaged by the automated inspecting and sorting system, they are shown to have the same or about the same color shade or value. It is, however, to be understood that the surface layer is not limited to providing a color to the particles, but may impart to the seed particle any property which is characteristic of undesirable particles. For example, in one embodiment particles may be distinguished based upon their density or their emission of secondary X-rays during X-ray irradiation as in the case of XRF. In another embodiment, particles may be distinguished by OES and, in an even more particular embodiment, by laser-induced OES as described, for example, by A. Rosenfeld, et al. in "Sorting of Aluminum Alloy Scrap by Laser Induced Optical Emission Spectroscopy," Third International Symposium on Recycling of Metals and Engineered Materials, The Minerals, Metals & Materials Society, pp. 751-763 (1995) which is incorporated by reference in its entirety as if fully set forth in this specification.

The surface layer is preferably formed of a material which does not have an undesirable effect on any products manufactured from the metal particles. An undesirable effect occurs when the inclusion of a material, whether intentional or inadvertent, causes the properties of the resulting product to be changed in an undesirable way. For example, if the mechanical properties of a ceramic, polymer, metal, alloy or manufactured product such as the ultimate tensile strength, tensile yield strength, elongation or fatigue resistance are unintentionally reduced due to the inclusion of the material, then it is said to have a undesirable effect on its properties. Such an undesirable effect is not limited to the properties listed above, but may also include any alteration of the microstructure, composition or other material property in an unintended way as a result of the inclusion of the material. Within this specification, the inclusion of nitrogen in a Ti alloy is considered to have an undesirable effect on the resulting properties if it is present in an amount greater than 0.1 weight percent (wt. %).

Although the production and use of seed particles is beneficial for sorting essentially any type of material such as, for example, ceramics, polymers, metals or ores, it is particularly well suited for sorting Ti sponge particles. Although this disclosure is not intended to be limited to Ti, the embodiments disclosed and described within this specification will be made with reference to systems for sorting Ti sponge particles due to the advantages an automated system affords to the Ti sponge sorting process.

During manufacturing operations, the surface of some Ti sponge particles may become oxidized or nitrided and, when this occurs, the Ti sponge is typically referred to as "burnt" Ti sponge. The presence of burnt Ti sponge in the process stream is undesirable because if it survives the melting phase its inclusion in subsequent metals, alloys or manufactured products may lead to the formation of hard alpha material or low density inclusions. These inclusions, if undetected by various quality checks, have an undesirable effect on the material properties of the finished product. Conventional Ti sponge has a silver or dull gray color, but the incorporation of nitrogen provides the titanium sponge particles with a distinctive gold, yellow, brown, black, blue, red or violet color.

When a batch is found to contain burnt Ti sponge, samples are typically chemically tested to determine whether nitrogen is present. If the nitrogen content is found to be higher than approximately 0.1 wt. %, the batch cannot be used for some specific applications. It is preferable that nitrided Ti sponge particles be removed from the process stream prior to remelting because of the undesirable effects nitrided Ti may have on the properties of a Ti alloy.

Identification and removal of burnt Ti sponge may be accomplished by manual or automated processes. Although the former is more time-consuming and costly, it is a method which is more well-known and is generally accepted in the industry. Human inspectors can be subject to some type of qualification process which may include, but is not limited to, testing the inspector's color vision and recognition of burnt Ti and/or foreign matter in the process stream. The use of automated inspecting and sorting processes offer the advantages of speed, lower operating costs and flexibility; however, it is difficult to ascertain their continued operation at acceptable detection levels and to verify that different systems function identically. In order to facilitate their adoption within the industry, it is necessary to demonstrate that an automated inspecting and sorting system can be both quick and inexpensive.

Within this disclosure, the basic components of an automated system for inspecting and sorting particles are described. A description of methods of producing and qualifying seed particles having at least one property whose value or range of values is the same as or about the same as a value or range of values of a corresponding property of undesirable particles is also described as well as the process of using the seed particles to qualify an automated inspecting and sorting system. Exemplary embodiments describing the formation, qualification, and use of actual Ti seed particles to qualify an automated inspecting and sorting system are disclosed.

I. Automated Inspecting and Sorting Systems

A number of color-based inspecting and sorting systems which have been adapted to sort metal particles are well-known in the art. An example is the Machine Vision system which has traditionally been used to inspect and sort a wide variety of products in the food industry. Some examples describing the use of Machine Vision systems are provide by P. H. Heinemann in "Machine Vision Inspection of 'Golden Delicious' Apples," Applied Engineering in Agriculture, Vol. 11, No. 6, pp. 901-906 (1995) as well as by Y. Tao, et al. in "Machine Vision for Color Inspection of Potatoes and Apples," Transactions of ASAE, Vol. 38, No. 5, pp. 1555-1561 (1995) and by Tom Pearson in "Machine Vision System for Automated Detection of Stained Pistachio Nuts," SPIE, Vol. 2345, pp. 95-103 (1995). Each of the aforementioned are incorporated by reference in their entirety as if fully set forth in this specification. An exemplary system for inspecting and sorting Ti sponge particles on the basis of color has been previously disclosed by Gigliotti whereas a system for inspecting and sorting scrap metal by color has been provided by Kumar.

Automated inspecting and sorting systems such as the Machine Vision system can be tailored to inspect and sort a process stream based upon the color of the individual particles. The inspecting and sorting process is accomplished using a color imaging system which identifies particles that are different from the majority. A proprietary software program is used to teach the system an acceptable color range for the particles. Any particle which is identified as having a color outside this predetermined range is categorically rejected. Within this specification, the terms "color" and "color value" are used interchangeably and are understood to have equivalent meanings. The particles themselves may be sorted using, for example, air jets, a mechanical arm with a suction cup on one end or some type of manipulator to manually remove the rejected particles.

A side view of a schematic showing the primary components of an exemplary inspecting and sorting system (100) which is known in the art is provided in FIG. 1. A loss-in-weight feeder (1) introduces particles along the full width of a moving surface (3) such as a conveyor belt through a feeder discharge chute (2). The feeder discharge chute (2) is designed to accelerate the particle feed such that it is evenly distributed over the exposed surface area. In one embodiment, the feeder discharge chute (2) creates a particle coverage amounting to approximately 25% of the exposed surface area. The moving surface (3) itself typically transports particles at a speed of, for example, approximately 480 feet per minute (ft/min). The conveyance speed can, however, be adjusted as needed in order to optimize the sorting process.

An upper high-intensity lamp (4) illuminates the particles as they are transported along the moving surface (3) whereas an upper line scan camera (5) acquires an image of the process stream as it passes a fixed point. The upper line scan camera (5) may be any suitable camera as is well-known in the art, but in a particular embodiment is comprised of 1024 pixels and is capable of high frequency scans. A bottom line scan camera (7) and bottom high-intensity lamp (8) are also provided to illuminate and acquire an image of the underside of the particles. The upper line scan camera (5) looks down on the moving surface (3) and, hence, acquires images with the moving surface (3) provided as a backdrop whereas the bottom line scan camera (7) looks up through the process stream and typically acquires images against a blue light emitting diode (LED) background.

Undesirable particles which are identified as having a color that falls outside the acceptable range are ejected by means of an air ejector (6) which, in one embodiment, is comprised of a plurality of nozzles spread out along the full width of the moving surface (3). In one embodiment the nozzles are spaced approximately one-fourth of an inch apart. When the location of an undesirable particle is identified, its position is ascertained by correlating the conveyance speed of the moving surface (3) with the distance between the positions of the upper line scan camera (5) and the air ejector (6). When a particle reaches the end of the moving surface (3), its forward momentum would normally transport it over the top surface of a cutting blade (9). However, when an undesirable particle has been identified and reaches the end of the moving surface (3), one or more of the plurality of air ejector (6) nozzles is activated when its position intercepts that of the undesirable particle(s). A strong puff of air is emitted from the targeted air ejector (6) nozzles to direct the undesirable particle(s) downwards such that they fall below the cutting blade (9) and are separated from the process stream.

It is to be understood that the inspecting and sorting system (100) disclosed in this specification and shown in FIG. 1 is merely exemplary of a plurality of such systems which are known in the art and may be used to sort particles. Furthermore, the automated sorting system illustrated in FIG. 1 is not drawn to scale. An illustration of an exemplary inspecting and sorting system analogous to that disclosed in this specification may be found in an article entitled "Understanding How Electronic Sorting Technology Helps Maximize Food Safety," which was published in June 2010 by Key Technology, Inc. and is incorporated by reference as if fully set forth in this specification. One feature of the inspecting and sorting system described in this specification is its ability to distinguish between objects based upon their color or color value and then remove from the process stream those objects whose color or color value falls outside the acceptable range. Although the particles are distinguished based upon their color or color value, such sorting systems may be adapted to sort particles based upon any other distinguishing material property such as their density, optical emission spectra or X-ray fluorescence which can be readily measured and analyzed by a sorting system.

The operation of the sorting system (100) may be tested and qualified using a set of standards which define the acuity of the sorting system (100). Although the sorting system's (100) capabilities can be demonstrated using actual undesirable particles, the production of seed particles as mock undesirable particles enables their use during routine setup and under standard operating conditions. The formation of seed particles is described in the following section.

II. Production of Seed Particles

One advantage of using seed particles is that while the seed particles mimic the properties of undesirable particles, products formed using particles from the process stream are not undesirably affected by the incorporation of the seed particles When used in a sorting system (100) which distinguishes particles based upon their color, the distinguishing property is therefore the color of the particles.

Another feature of the seed particles is that their shape is such that they remain stationary while being transported along the moving surface (3). Any shape may be used so long as it has sufficient supporting points and/or facets to prevent it from rolling on the moving surface (3) between the point at which it is first imaged by the upper line scan camera (5) and when it reaches the air ejector (6). The particles must remain stationary to ensure that the undesirable particles scanned by the upper line scan camera (5) and identified by the system are the same particles that are subsequently removed from the process stream once they reach the air ejector (6).

Particles having the desired shape, size and surface features may be obtained from the process stream so that they may be formed into seed particles. The average size of the seed particles may be controlled by crushing and/or grinding the particles and then passing them through an appropriately sized sieve or mesh. Although the average size of the particles used to produce the seed particles is not limited to any specific value or range of values, in a particular embodiment, for metal particles the average particle diameter is about 2 mm, about 3 mm or about 4 mm. These particle sizes are especially suited for use in the production of Ti sponge seed particles.

A. Formation of a Conformal Surface Layer

A variety of methods may be used to process the selected particles and produce seed particles having the appropriate color or colors. In one embodiment, color may be imparted to the particles by applying a dye or coating of paint having the desired color. The desired color may be accomplished by conventional spray, brush, immersion or any other application technique which is well-known in the art. A disadvantage of this technique is that the paint itself may be manufactured by a third party and its continued availability may become an issue. Furthermore, there may be issues associated with color uniformity between separate batches of paint. Yet another issue is that the paint coating will be more likely to chip or wear with repeated handling.

In another embodiment, an ultrathin and conformal film having the desired color may be formed by thin film deposition processes which include, but are not limited to anodization, electroplating, chemical vapor deposition (CVD) and physical vapor deposition (PVD). Film growth by CVD may be facilitated by the use of processes which stimulate film growth such as plasma enhanced CVD. Growth by PVD may be accomplished using deposition techniques which include, but are not limited to, thermal evaporation, e-beam evaporation and sputtering. Deposition of a conformal surface coating using the film growth techniques described above will also yield a more durable and long-lasting coating which is less likely to wear with repeated handling and use. These deposition techniques are well-known in the art and a detailed description thereof will be omitted.

The material deposited as a conformal thin film preferably provides the surfaces of the coated particles with a color whose value or range of values is the same as or about the same as a corresponding value or range of values of known undesirable particles. The color may be controlled by varying deposition or application parameters such as the composition, thickness and/or temperature. In a particular embodiment, the material used to form the surface layer does not undesirably influence the properties of any finished product manufactured using particles obtained from the process flow. That is, the surface layer produced on the seed particles is such that if they were to inadvertently bypass the sorting system and be incorporated into the process stream, their presence would not impact the properties of the resulting product in an undesirable manner.

In some embodiments, the seed particles may be coated with an ultraviolet (UV) paint to "tag" the seed particles such that they may be distinguished from conventional undesirable particles. Application of UV paint of various colors such as yellow, green, blue or red may be used to distinguish between different types of seed particles. The UV paint is transparent under visible light, but becomes visible when exposed to an UV light source. By subjecting the UV painted seed particles to an UV light source such as a black light, they may be readily identified and distinguished from normal undesirable particles contained within the process stream.

For applications involving Ti sponge, the formation of an oxide layer on the surface of the Ti sponge particles has been discovered to be an effective way of forming seed particles having a color whose value or range of values is the same as or about the same as a corresponding value or range of values of nitrided Ti sponge. Since oxygen is an element which is typically found in Ti and Ti alloys, the inclusion of oxidized Ti sponge seed particles into the process stream typically would not have an undesirable effect on the properties of the subsequent Ti metal, alloy or finished product formed using particles from the process stream. Furthermore, the color of the oxidized Ti sponge particles may be controlled by varying the thickness of the oxide layer. Changes in the thickness of the oxide layer produce changes in color due to the interference of incident and reflected light.

An oxidized Ti layer may be readily deposited onto the surface of a plurality of Ti sponge particles as a conformal thin film using any of the processes described above including, but not limited to anodization, electroplating, CVD and PVD film growth techniques. From among these, anodization is a comparatively low-cost process which may be readily adapted for use with Ti sponge particles. Anodization is also readily reproducible and can produce a range of colors for testing purposes. The anodization of Ti has been previously described in detail by, for example, J.-L. Delplancke, et al. in "Self-Colour Anodizing of Titanium," Surface Technology, 16 pp. 153-162 (1982) which is incorporated by reference in its entirety as if fully set forth in this specification.

In one embodiment, anodization of Ti sponge particles may be accomplished by submersing a plurality of particles in an electrolyte having a predetermined temperature. Exemplary electrolytes which may be used include sodium bicarbonate or sulfuric acid. The Ti fragments are allowed to sit on a titanium plate or pan, a metal cathode is immersed in the electrolyte and a direct current is applied between the electrodes. The oxide layer thickness and, hence, the color of the Ti sponge particles may be controlled by varying parameters which include, but are not limited to the applied voltage, the type, concentration and temperature of the electrolyte, as well as the anodization time. A well-defined set of parameters for anodizing Ti particles can be established and used to produce a set of standards. In a particular embodiment, Ti sponge is anodized at room temperature in a solution containing 10% sodium bicarbonate and water. Anodization may be performed by, for example, applying a voltage of 52 or 22 Volts (V) for a duration of 10 to 20 minutes until the color of the Ti sponge is the same as that of burnt Ti sponge samples.

In another embodiment, a sheet or foil of Ti may be anodized to produce colors whose value or range of values is the same as or about the same as a corresponding value or range of values of nitrided Ti sponge. The anodized sheet or foil may then be secured to the sides of a suitable substrate to produce a coated seed particle. The substrate may be, for example, a plastic cube or pyramid having a size analogous to the Ti sponge particles being inspected. The most useful shapes are those that will remain stationary during transport on a moving surface. Seed particles produced in this manner may, however, be useful for the production of color standards which may be used to periodically test the settings of the automated sorting system.

In yet another embodiment, seeds comprised of pre-cut samples of Ti such as a cube or pyramid may have a conformal surface layer formed thereon. The surface layer imparts a color whose value or range of values is the same as or about the same as a corresponding value or range of values of undesirable particles to the pre-cut sample using any of the processes described above (i.e., anodization, electroplating, CVD and PVD). Seed particles of this type may be used to test the settings of an automated sorting system. It is to be understood that although the production of seed particles in this section has been described using a Ti sheet, foil or pre-cut sample as an example it is to be understood that this is merely exemplary and any of a plurality of other metals or substrates may be used.

B. Qualifying the Seed Particles

After a plurality of seed particles having the desired shape, size and color have been produced, the next step is to qualify the seed particles themselves by subjecting them to inspection by an automated inspecting and sorting system (100). The qualification process is necessary to ensure that the color and other characteristics of the thus-formed seed particles are of sufficient quality to accurately mimic those of undesirable particles. Furthermore, the seed particles should be reliably detected by an automated inspecting and sorting system which is operating under standard conditions.

Figure 2:
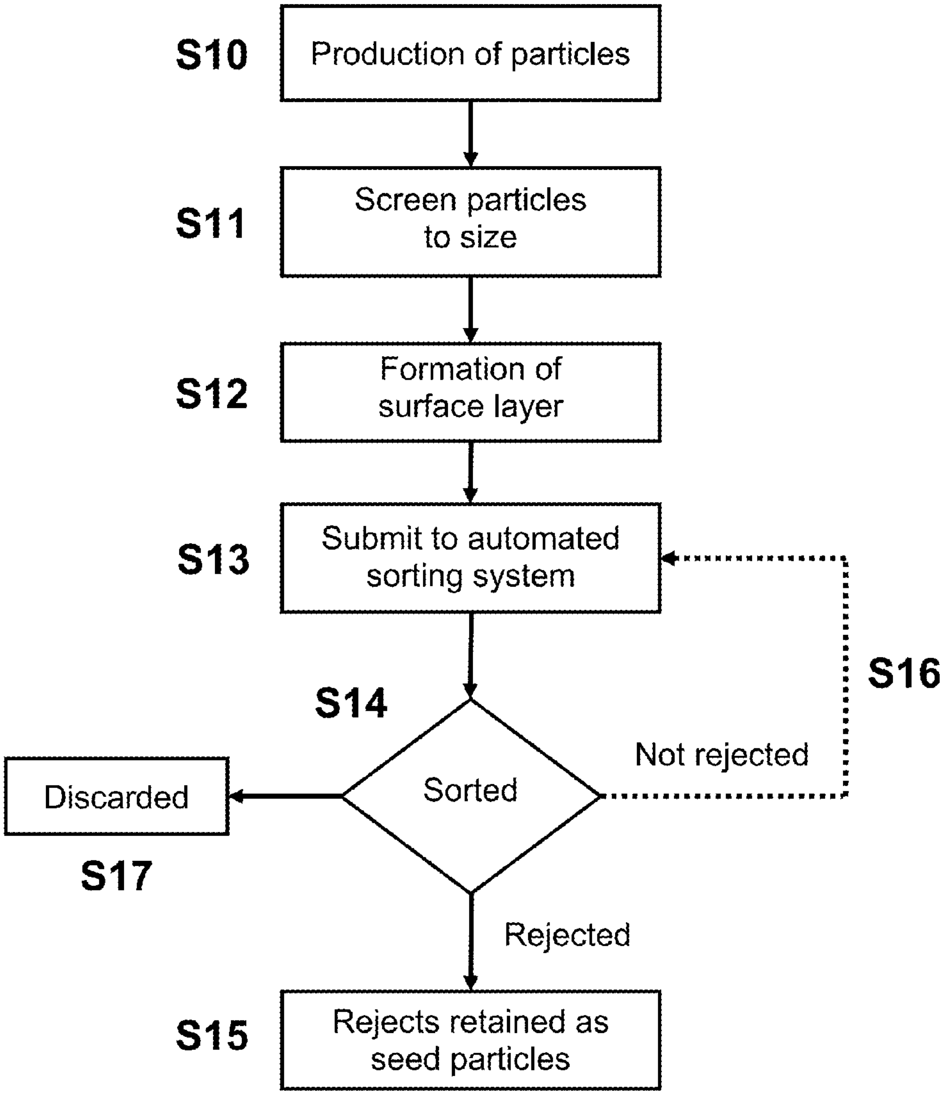
FIG. 2 is a flowchart illustrating the sequence of steps used to produce and qualify seed particles.

An exemplary flowchart showing the overall process for producing seed particles, imparting the desired color(s) and then qualifying the seed particles is provided in FIG. 2. The production of particles and the formation of a conformal surface layer are summarized in steps S10 through S12. Initially, in step S10 a plurality of particles of the desired shape, size range, and composition are produced. In step S11, the particles are screened via the appropriately sized mesh to separate out those particles having the desired size distribution. A surface layer is then formed on the particles in step S12 to yield coated seed particles. Separate batches may be processed simultaneously in step S12 to produce seed particles having different colors. In step S13, the coated seed particles are submitted to the automated sorting system where they are sorted in step S14. The sorting process is generally done by submitting seed particles of a single color at a time.

An automated inspecting and sorting system itself has previously been described with reference to FIG. 1 and is preprogrammed to accept particles whose color falls within a predetermined range and then to reject the particles if their color is outside the acceptable range. In one embodiment, the individual colors or ranges of colors that are deemed acceptable are set using color values obtained from actual undesirable particles. These colors values are loaded into the automated sorting system and used to determine which particles qualify to be used as seed particles. Particles whose color falls outside the acceptable range are rejected and may be retained and used as seed particles in step S15. If the particles are not rejected and, hence, pass through the sorting system, they may optionally be inspected and resubmitted to the automated sorting system in step S16 or they may be discarded in step S17. If any flaws in the surface layer are found after the first pass through the automated sorting system, in some embodiments the seed particles may be repaired and then reintroduced to the automated sorting system for further testing. Particles which are submitted to the sorter and are not rejected after two passes are typically discarded. It is conceivable that seed particles which are rejected by the sorter a first time may also be resubmitted to provide additional confidence that they are being properly rejected.

III. Qualifying a System for Inspecting and Sorting Particles

Figure 3:
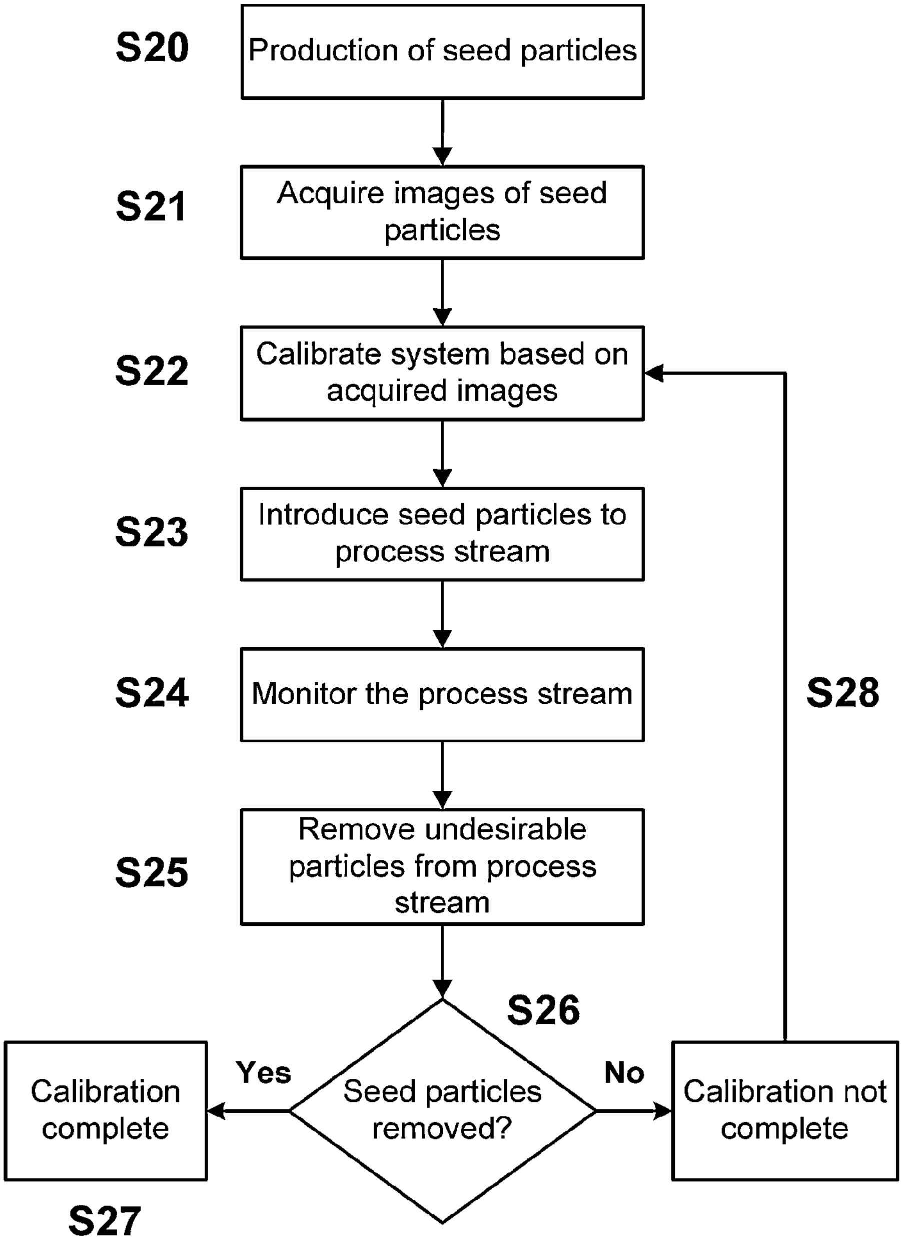
FIG. 3 is a flowchart illustrating an exemplary method of qualifying an automated inspecting and sorting system using seed particles.

Once a suitable number of seed particles having the desired size, shape, and range of colors have been qualified, they may themselves be used to qualify an automated inspecting and sorting system. An exemplary flowchart showing the sequence of steps followed in a method of qualifying an automated inspecting and sorting system using seed particles is provided in FIG. 3. It is to be understood that the flowchart shown in FIG. 3 is merely exemplary; and provides an illustrative example which embodies the spirit and scope of the present invention. Any of a number of variations may be implemented without deviating from the inventive concept.

Initially a plurality of seed particles having the desired size and color distribution are produced in step S20 using the procedures described in Section II above. The seed particles are then introduced to the automated sorting system where images of individual seed particles are initially acquired in step S21. The automated sorting system is then calibrated in step S22 to recognize the color or range of colors associated with each seed particle such that particles having that particular color or range of colors may be identified and rejected. It is generally necessary to perform the calibration step S22 for each seed color. Those seed particles having the appropriate properties are used to ensure that the automated sorting system recognizes and subsequently rejects those particles (both seed and undesirable particles) having the appropriate properties.

Once the automated inspecting and sorting system is calibrated, in step S23 the seed particles may then be introduced to an actual process stream which is transmitted through the automated inspecting and sorting system. The seed particles themselves are typically introduced at random intervals and are included such that they are evenly distributed throughout the particles contained within the process stream. The particles are typically transported along a moving surface such as a conveyor belt and are monitored in step S24 using one or more image acquisition devices such as a camera. The calibration process performed in step S22 allows the automated sorting system to distinguish between acceptable particles and undesirable particles within the process stream. The particles are typically distinguished based upon their color which are identified through the monitoring process. Systems for capturing an image of the particles as they are transported along a moving surface, converting the image to a color signal, and then comparing the color signal to acceptable values are well-known in the art and have been previously described in detail by others such as Gigliotti. If a particle's color falls outside an acceptable user-defined range, then the particle is identified as an undesirable particle and is removed from the process stream in step S25.

Once all of the seed particles have been transmitted through the automated sorting system, in step S26 it is determined whether the total number of seed particles removed is equal to the number of seed particles that were introduced to the process stream. If yes, then this indicates that the automated sorting system is functioning according to its intended purpose and the calibration process is determined to be complete in step S27. If it is determined in step S26 that fewer than all of the seed particles have been removed from the process stream, then in step S28 the calibration process may be determined to be incomplete. In this case the process flow returns to step S22 where the automated sorting system is recalibrated and steps S23 through S26 are repeated. In some embodiments, seed particles which are not removed in step S26 are discarded since they may not be suitable for use in the process.

When sorting an actual process stream during startup or under standard operating conditions, the seed particles need to be distinguished from conventional undesirable particles. In one embodiment, seed and undesirable particles may be distinguished by, for example, applying UV paint to the seed particles as described in Section I above. When inspecting the rejected particles under UV light, the seed particles will be readily visible and can be selectively removed and counted.

In some embodiments it may be permissible to sacrifice sorting accuracy in order to process particles at higher speeds. In this case it will generally only be necessary to ensure that the sorting accuracy remains above a predetermined threshold (i.e., a predetermined recovery percentage). For example, if it is necessary for the automated sorting system to recover at least 80% of the seed particles introduced to the process stream, then the qualification process shown in FIG. 3 need only be performed to ensure that the fraction of particles recovered remains above 80%. It is to be noted that the qualification process itself, including the establishment of a predetermined recovery percentage, is typically performed for each color of seed particle that is introduced to the automated sorting system. What constitutes an acceptable recovery percentage will typically vary, being a function of the machine performance and the total number of seeds used in the test.

It will be readily apparent to persons skilled in the art that a large number of variations may be implemented into the flowchart shown in FIG. 3 without deviating from the spirit and scope of the present invention. For example, the rejected particles may be reintroduced to the process stream so that they may be given a second or even a third look by the sorting system. Reintroducing rejected particles into the process stream helps reduce the number of particles that may be mistakenly rejected by the system. In another embodiment, seed particles may be added to a process stream sorted by human inspectors to test the operational efficiency of the human inspectors.

In another embodiment, more than one sorting apparatus may be used, with one being provided downstream to the other and with each having the same or different criteria for sorting particles. Rejected particles from the first sorter may be sent to the second sorter for reexamination using a different set of criteria. Process parameters that may be varied between a first and second sorter include, for example, the feed rate, transport speed, the range of acceptable colors and the imaging conditions. The feed rate is typically controlled by a feeder which controls the amount of material fed to a sorter in units of mass (pounds or kilograms) per hour. The transport speed is generally controlled by varying the speed of the moving surface such as a conveyor belt (e.g., the belt speed). As noted above, the transport speed may have a value of, for example, 480 ft/min or 600 ft/min. The transport speed used is typically controlled using the system software.

Figure 4:
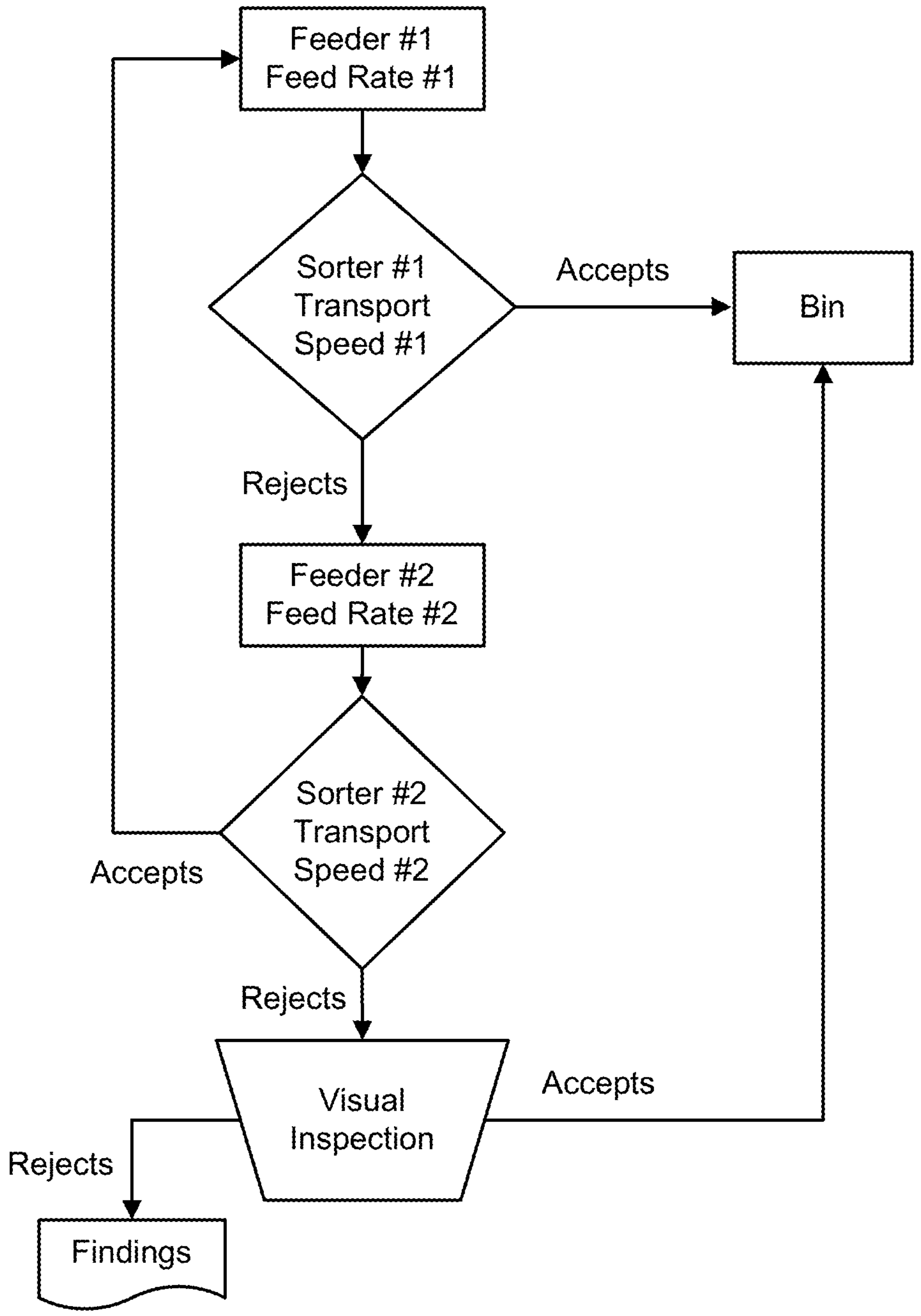
FIG. 4 is a flowchart showing an exemplary method of sorting particles using a plurality of automated inspecting and sorting systems.

An example of a system which includes a first and second sorter is provided by the flowchart shown in FIG. 4. In this embodiment, Feeder #1 initially supplies metal particles to Sorter #1 at Feed Rate #1. Sorter #1 then processes the particles at Transport Speed #1. Particles which pass through and, hence, are accepted by Sorter #1 are sent to a Bin where they may be subject to the next step in the manufacturing process. The rejected particles from Sorter #1 are sent to Feeder #2 where they are then fed to Sorter #2 at Feed Rate #2 which, in a particular embodiment is less than Feed Rate #1. Sorter #2 then processes the particles at Transport Speed #2. Particles which pass through and, hence, are accepted by Sorter #2 are sent back to Feeder #1 so that they may be reintroduced to Sorter #1. Rejects from Sorter #2 are subject to visual inspection where they are either rejected or accepted and sent to the Bin.

By using the process flow shown in FIG. 4, the process stream can initially be sorted at a relatively high feed rate by Sorter #1 which typically produces a larger number of rejected particles. The rejected particles can then be resorted at a slower feed rate using Sorter #2 with the accepted particles being sent back to Feeder #1 while the rejected metal particles from Sorter #2 are visually inspected and, in some instances, subjected to chemical analysis. Particles that pass visual inspection are sent to the Bin while those particles that fail the visual and/or chemical inspection are typically discarded or subject to further analysis.

Figure 5:
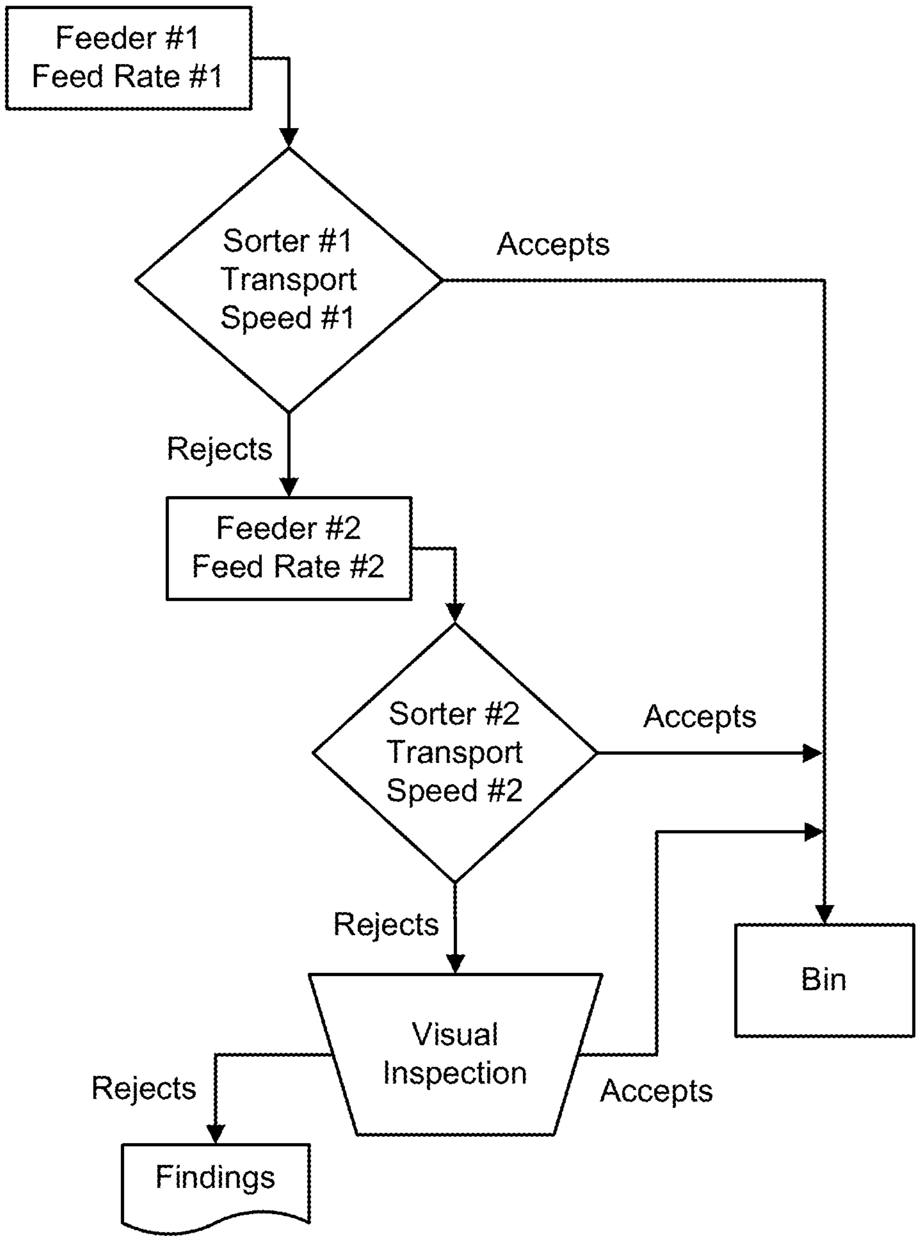
FIG. 5 is a flowchart showing another exemplary method of sorting particles using a plurality of automated inspecting and sorting systems.

Another example of a process flow which utilizes more than one sorting apparatus is provided in FIG. 5. In this embodiment the particles are initially sent from Feeder #1 to Sorter #1 at Feed Rate #1 where the particles are then processed by Sorter #1 at Transport Speed #1. Particles which pass through and, hence, are accepted by Sorter #1 are sent to the Bin. The rejected particles from Sorter #1 are sent to Feeder #2 where they are then fed to Sorter #2 at Feed Rate #2. The particles are then processed by Sorter #2 at Transport Speed #2. Although the feed rates used may be any suitable value, in a particular embodiment, Feed Rate #2 is less than Feed Rate #1. In this embodiment, rather than being sent back to Feeder #1, those particles which pass through and, hence, are accepted by Sorter #2 are sent to the Bin. Rejects from Sorter #2 are also subject to visual inspection and/or chemical analysis where they are either rejected or accepted and send to the tote. The use of a second sorter to inspect the rejects from the first sorter at a slower feed rate increases both the overall sorting accuracy and speed.

IV. Exemplary Embodiments

Exemplary embodiments in which actual seed particles are produced and inspecting and sorting systems are tested are provided. Although the examples provided in this section involve the production of Ti seed particles and their use to inspect and sort Ti sponge, it is to be understood that the methods may find applications with any type of particle including, for example, ceramics, polymers, gemstones, metal or ore particles.

Example #1

Figure 6A:
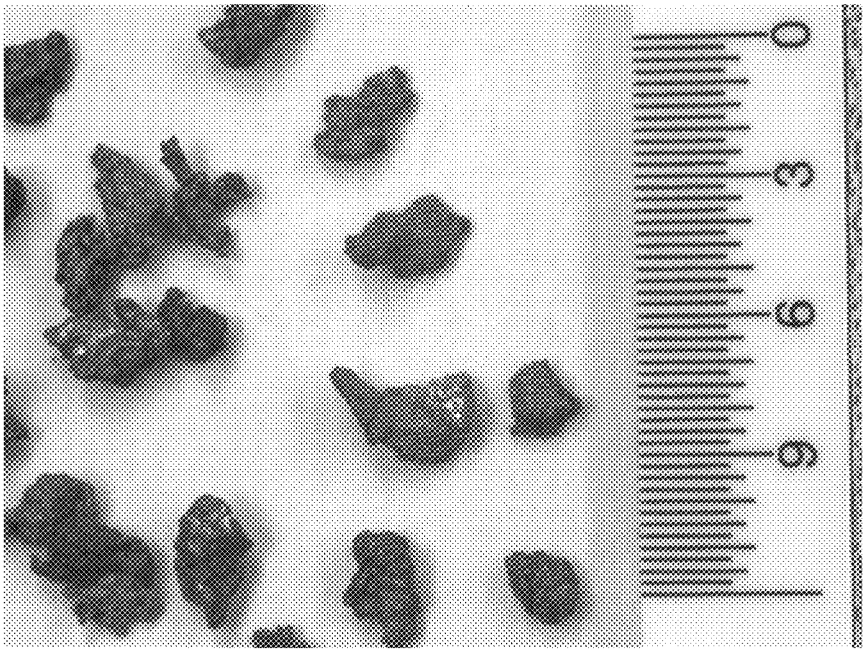
FIG. 6A shows exemplary Ti sponge particles which have been anodized in a solution of 10% sodium bicarbonate in water at 52 volts for 20 minutes.
Figure 6B:
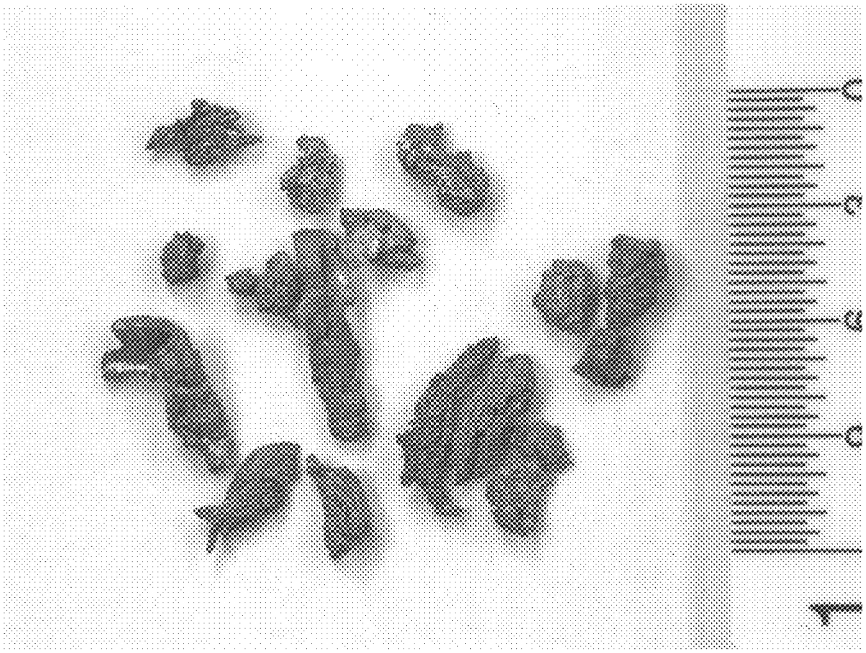
FIG. 6B shows exemplary Ti sponge particles which have been anodized in a solution of 10% sodium bicarbonate in water at 22 volts for 20 minutes.

Ti sponge fragments which were sieved to an 8 mesh size were anodized in a solution of 10% sodium bicarbonate ($NaHCO_3$) and water at room temperature to form an oxide layer having a targeted thickness. The Ti sponge particles were allowed to sit on a titanium plate contained within solution. A metal cathode was immersed in the electrolyte and a direct current was applied between the electrodes. One batch of Ti sponge fragments was anodized at an applied voltage of 52 volts (V) for 20 minutes (min) while a second batch was anodized at 22 V for 20 min. A dark black/blue surface layer was produced on the surfaces of the Ti sponge fragments anodized at 52 V as shown, for example, in FIG. 6A The ruler on the right in FIG. 6A is in centimeters (cm) and provides a reference framework. Ti fragments having a dark black/blue color represent the most severe oxidation or nitridation that may occur during the manufacture of Ti sponge particles. The Ti sponge fragments anodized at 22 V are shown in FIG. 6B These seed particles exhibited a lighter color which is more typical of nitride particles found under standard processing conditions.

Example #2

An Optyx Model 3755 sorting machine which operates in a manner analogous to the sorting system illustrated in FIG. 1 was mounted on a small platform and a loss-in-weight type feeder was used to feed Ti sponge to the sorting machine. Feed rates ranging from 900 to 2,100 pounds (lbs) per hour (h) were used. The system was configured such that a conveyor belt transports the Ti particles at approximately 480 feet per minute. Both the upper and lower camera was used to image the process stream as it was transported on the conveyor belt. The upper camera faced the belt used to convey Ti sponge particles whereas the lower camera faced a line of blue light emitting diodes (LEDs). The Optyx system was operated using the Key Technology software package, "Keywear 2.01."

A lot comprised of 5 mesh (4 mm) Ti sponge along with two drums of 5 mesh scrap-grade Ti sponge were used for initial tuning experiments. The sorting process was initiated by loading undesirable particle types into the computerized vision system. Undesirable particle types were loaded by feeding samples of undesirable particles from a library which has been formed and is continually updated based upon known undesirable particles that have been identified by the automated inspecting and sorting system. Samples of black rubber, wood, paper, off-color sponge, burnt sponge, plastic and a variety of other undesirable particles were loaded into the system. The smallest undesirable particle that could be successfully loaded corresponded to three pixels. The line scan camera used in the sorting machine had a 1024 pixel scan length and scans were taken at a rate of approximately 4,000 times per second. Each pixel measured approximately 0.02 inches (0.5 mm) on a side. Once a type of undesirable particle was loaded into the database, it was given an identifying name. Different undesirable particle classes or types can be activated or deactivated in the sorting machine as needed.

Seed particles were produced using 0.25 inch Ti cubes which were anodized to produce seed particles having a dark yellow-golden color and which resemble $Ti_{1-x}N_x$ samples having 22% nitrogen ("22% TiN"). A total of fifteen anodized 0.25-inch Ti cubes were added to the batch of 5 mesh Ti sponge to determine the sorting machine's ability to detect the Ti seed particles. An identical test was performed using actual 22% TiN samples of burnt Ti sponge to serve as a basis for comparison. The test results are provided in Table 1 below:

TABLE 1

Comparison of sorting tests for Ti seed and burnt Ti sponge

| Eject Fired | Passed | Rejected |
|---|---|---|
| ¼ inch Anodized Ti Cubes | | |
| 15 | 1 | 14 |
| 15 | 0 | 15 |
| 15 | 0 | 15 |
| 15 | 0 | 15 |
| 15 | 0 | 15 |
| 15 | 0 | 15 |

TABLE 1-continued

| Comparison of sorting tests for Ti seed and burnt Ti sponge | | |
|---|---|---|
| Eject Fired | Passed | Rejected |
| 22% TiN | | |
| 15 | 0 | 15 |
| 15 | 0 | 15 |
| 15 | 0 | 15 |
| 14 | 1 | 14 |
| 15 | 0 | 15 |

The left column in Table 1 represents the number of seed or undesirable particles that were added to the process stream, the central column represents the number of undesirable or seed particles that passed through the sorting system whereas the right column indicates the total number of particles that were rejected. As Table 1 shows, rejection of the anodized Ti cubes occurred at the same rate as the burnt Ti sponge particles. The identical rejection rates indicate that anodized 0.25 inch Ti cubes may be used to test the sorting capability of the system.

Example #3

In this example, a large batch of Ti sponge particles was sorted to determine the accuracy of the sorting process. A total of approximately 12,000 lbs of 5 mesh Ti sponge was processed by the same Optyx Model 3755 sorting machine disclosed in Example 2. Five separate batches of between 2,700 to 3,800 lbs each were sorted. Two separate test runs were performed on each individual batch of Ti sponge particles. The sorting accuracy was measured in two ways. First, the total weight of undesirable particles removed by the sorting machine was compared between the two test runs; and second, the total number of undesirable particles of each type removed by the sorting machine were compared between the two test runs. In each test run, the total amount of Ti sponge sent to the undesirable particle stream was similar between the two test runs while the Ti sponge was sorted at a feed rate of 1,500 lbs/hr. The accuracy of the sorting process is measured by dividing the total number of undesirable particles found during the first sorting test by the total number of undesirable particles found during the first and second sorting tests. The results of the sorting process are summarized in Table 2 below:

TABLE 2

| Undesirable particle type and sorting accuracy at a 1,500 lb/hr feed rate and a 480 ft/min belt speed | | | | | | | | | | | |
|---|---|---|---|---|---|---|---|---|---|---|---|
| | BLEND | | | | | | | | | | |
| | B-372 | | B-381 | | B-358 | | B-358 | | B-371 | | |
| Undesirable Particle Type | Sort (count) | Resort | Sort (count) | Resort | Sort (count) | Resort | Sort (count) | Resort | Sort (count) | Resort | Avg. |
| Rust Colored Sponge | 17 | 10 | 100 | 28 | 86 | 55 | 14 | 3 | 257 | 99 | |
| Blue colored foil | 82 | 48 | 23 | 4 | 107 | 34 | 110 | 50 | 100 | 22 | |
| Discolored Sponge | 108 | 1 | 42 | 1 | 2 | 2 | 1 | 5 | 2 | 0 | |
| Gold Colored Foil | 155 | 80 | 27 | 18 | 794 | 257 | 779 | 416 | 219 | 56 | |
| Paint Chip | 3 | 0 | 1 | 0 | 0 | 0 | 1 | 0 | 1 | 0 | |
| Painted Titanium | 1 | 0 | 7 | 0 | 0 | 0 | 0 | 0 | 0 | 0 | |
| Off Color | 10 | 3 | 6 | 4 | 18 | 0 | 2 | 0 | 4 | 6 | |
| Crystal/Skin | 63 | 40 | 261 | 115 | 82 | 65 | 133 | 86 | 97 | 65 | |
| Plastic | 6 | 1 | 18 | 8 | 0 | 0 | 0 | 0 | 5 | 0 | |
| Mg | 1 | 0 | 28 | 2 | 0 | 0 | 0 | 0 | 0 | 1 | |
| $MgCl_2$ | 1 | 0 | 27 | 6 | 10 | 3 | 7 | 1 | 26 | 7 | |
| Silver Foil | 139 | 56 | 11 | 3 | 151 | 76 | 139 | 90 | 24 | 120 | |
| Wood | 4 | 1 | 9 | 0 | 0 | 0 | 0 | 0 | 119 | 8 | |
| Unknown | 2 | 0 | 2 | 4 | 1 | 0 | 0 | 1 | 1 | 0 | |
| Scale | 38 | 3 | 3 | 0 | 6 | 1 | 0 | 1 | 2 | 1 | |
| Paper | 0 | | 7 | 0 | 4 | 0 | 0 | 0 | 66 | 29 | |
| Insect parts | 0 | | 0 | 0 | 1 | 0 | 0 | 0 | 1 | 1 | |
| Cigarette | 0 | | 1 | 2 | 0 | 0 | 0 | 0 | 0 | 0 | |
| Ferro-ti | 0 | | 1 | 15 | 9 | 2 | 3 | 6 | 6 | 4 | |
| RTV | 0 | | 1 | 0 | 0 | 0 | 0 | 0 | 1 | 1 | |
| Rubber | 0 | | 1 | 2 | 1 | 0 | 3 | 0 | 0 | 0 | |
| Pine needle | 0 | | 0 | 11 | 0 | 0 | 0 | 0 | 0 | 0 | |
| Sun flower seed | 0 | | 0 | 1 | 1 | 0 | 1 | 0 | 1 | 0 | |
| Tape | 0 | | 0 | | 0 | | 0 | | 1 | 0 | |
| Pounds sorted | 13.7 | 10.92 | 6.652 | 1.91 | 32.3 | 37.09 | 36.59 | 37.82 | 30.77 | 33.12 | |
| Pounds sorted of undesirable particles | 0.7 | 0.23 | 0.652 | 0.196 | 1.918 | 0.61 | 1.769 | 0.91 | 0.978 | 0.426 | |
| Total pounds | 3292 | | 2942 | | 3830 | | 3360 | | 2704 | | |
| Accuracy (rust, disc, rubber, off color) | | 0.91 | | 0.80 | | 0.65 | | 0.65 | | 0.72 | 0.75 |
| Accuracy (foreign) | | 0.92 | | 0.78 | | 0.85 | | 0.75 | | 0.82 | 0.82 |
| Accuracy (blue foil) | | 0.63 | | 0.85 | | 0.76 | | 0.69 | | 0.82 | 0.75 |
| Accuracy by weight | | 0.75 | | 0.77 | | 0.76 | | 0.66 | | 0.70 | 0.73 |
| Loss rate (%) | 0.4 | 0.3 | 0.25 | 0.07 | 0.9 | 1.0 | 1.1 | 1.2 | 1.2 | 1.2 | |

The results provided in Table 2 show that the accuracy of detection and removal of rust, disc, rubber and off-color samples as averaged over all five batches was 75%. This means that 75% of these undesirable particles were removed from the process stream by the automated sorting system. For foreign matter, the accuracy was 82%, and for blue foil the sorting system exhibited an accuracy of 75%. By weight, the overall accuracy of the sorting system was found to be an average of 73%.

Example #4

In this example, five batches of Ti sponge particles were sorted in a manner analogous to that described in Example 3. The Ti sponge was sized using a 5 mesh screen whereas the undesirable particles were further sized using a 12 mesh screen to remove very fine particles from the undesirable particle stream. A reduced feed rate of 1,000 lb/hr was used during the sorting process. The results are summarized in Table 3 below.

TABLE 3

Undesirable particle type and sorting accuracy at a 1,000 lb/hr feed rate

| | BLEND | | | | | | | | | |
|---|---|---|---|---|---|---|---|---|---|---|
| | Batch #1 | | Batch #2 | | Batch #3 | | Batch #4 | | Batch #5 | |
| Undesirable particle Type | Sort (count) | ReSort | Sort (count) | ReSort | Sort (count) | ReSort | Sort (count) | ReSort | Sort (count) | ReSort |
| Insect/Plant Fiber | 2 | 3 | | | 4 | 3 | | | | |
| Wood | 1 | 0 | | | | | | | | |
| Feather | | | | | | | | | | |
| $MgCl_2$ | 16 | 2 | 14 | 2 | 51 | 20 | 5 | 1 | 73 | 8 |
| Mg | 0 | 1 | | | 1 | 1 | | | 0 | 1 |
| Rubber | 2 | 0 | 84 | 4 | 2 | 0 | 6 | 2 | 85 | 2 |
| Discolored | 12 | 1 | 16 | 0 | 49 | 2 | 6 | 4 | 34 | 4 |
| Blue Foil | 6 | 8 | 26 | 12 | 17 | 0 | 35 | 15 | 17 | 7 |
| Yellow Paint | | | | | | | | | | |
| White Plastic | | | | | | 1 | 1 | | 5 | 1 |
| Paper | 1 | 0 | | | 16 | 5 | | | | |
| Scale | 1 | 0 | 0 | 1 | 11 | 1 | | | | |
| Foil | 7 | 4 | 11 | 0 | 0 | 0 | 7 | 5 | | |
| Gold Foil | 22 | 0 | 55 | 29 | 0 | 5 | 31 | 16 | 19 | 0 |
| Unknown | 6 | 0 | | | 12 | | 3 | 0 | 1 | 0 |
| Rust Colored Sponge | | | | | 10 | | | | 9 | 3 |
| Rate (lb/hr) | 868 | 903 | 666 | 666 | 823 | 856 | 1533 | 1022 | 960 | 991 |
| Wt | 391 | 391 | 311 | 311 | 357 | 357 | 511 | 511 | 512 | 512 |
| Wt Undesirable particle | 5.9 | 4.2 | 5.2 | 3.89 | 5.62 | 4.46 | 5.18 | 2.64 | 4.7 | 3.5 |
| Wt-12 mesh | 1.6 | 0.265 | 2.05 | 1.25 | 2.5 | 1.78 | 2.32 | 1.1 | 2.6 | 1.5 |
| % undesirable particle (wt) | 1.9 | 1.1 | 1.1 | 1.65 | 2.3 | 1.75 | 1.5 | 0.7 | 1.4 | 0.97 |
| Accuracy | 0.821 | | 0.802 | | 0.82 | | 0.696 | | 0.903 | |

The results in Table 3 show that the detection accuracy over five batches of samples ranged from a low of 69.6% to a high of 90.3%. The average percentage of undesirable particles removed from the process stream was 80.8%. It is likely that the higher recovery value can be attributed to the lower feed rate used during this test run.

Example #5

In this example, a plurality of Ti sponge particles which were initially screened to produce separate batches of 6, 7, 8, and 12 mesh particles. Each batch was anodized by immersion in a 10% solution of sodium bicarbonate and applying a direct current at 22 V or 52 V for up to 20 minutes in the manner described in Example 1 to produce Ti seed particles. The thus-formed Ti seed particles were then painted with fluorescent paint.

After the Ti seed particles were formed, they were individually tested for color recognition by passing them through an automated inspecting and sorting system analogous to that described in Example 2. When the sorting system is properly configured, there is substantially a 100% rejection of the 6 and 8 mesh blue and 8 mesh red Ti seed particle. Under standard operating conditions about half (50%) of the 12 mesh blue Ti seed particles are rejected whereas only a small fraction of the 7 mesh gold Ti seed particles were rejected. The smaller rejection rate of the 12 mesh blue Ti seed particles is due to their small size whereas the low rejection rate of gold Ti seed particles is due to the difficulty in producing adequately colored gold Ti seed particles. The size, color and number of Ti seed particles used in this example are listed in Table 4 below.

TABLE 4

Ti seed particle sizes and colors

| Size | Color | Seed count |
|---|---|---|
| 6 mesh | Blue | 5 |
| 7 mesh | Gold | 5 |
| 8 mesh | Blue | 10 |
| 8 mesh | Red | 10 |
| 12 mesh | Blue | 10 |

Ti seed particles were then used to determine the recovery rate of an automated inspecting and sorting system analogous to that described in Example 2 and shown in FIG. 1. In this example, the operation of an automated inspecting and sorting system having the configuration shown in FIG. 5 was tested by first sorting a batch of Ti sponge particles at a first feed rate and then resorting the rejected particles from that same batch using the same sorting system which is operated at a second feed rate.

The Ti seed particles are added to individual batches of Ti sponge particles at random intervals and then subject to inspection by the automated sorting system. The first sort is performed at high speed, using a nominal feed rate of 3,400 lb/hr. The instantaneous feed rate would vary between 2,700 to 3,700 lb/hr, but would typically remain steady at a rate of about 3,400 lb/hr. The rejected particles from this initial sorting run were then retained and resubmitted to the automated sorting system for a second sort at low speed, using a feed rate of 1,000 lb/hr. The actual feed rate would vary from a low of 920 to a high of 1,100 lb/hr, but was maintained at a nominal value of 1,000 lb/hr. The rejects from the second sort were then observed under a black light and the Ti seed particles were recovered. The recovery rate obtained for five separate batches of Ti sponge particles (Batch Nos. A1-A5) which were processed by the automated inspecting and sorting system is provided in Table 5 below.

TABLE 5

Ti seed particle recovery (%) by automated inspecting and sorting system using a first sort at 3,400 lb/hr and a second sort at 1,000 lb/hr.

| | Ti Seed Particle Recovery Rate (%) | | | | |
|---|---|---|---|---|---|
| Batch No. | 6 mesh Blue | 7 mesh Gold | 8 mesh Blue | 8 mesh Red | 12 mesh Blue |
| A1 | 80% | 80% | 60% | 70% | 40% |
| A2 | 40% | 60% | 70% | 100% | 40% |
| A3 | 80% | 80% | 100% | 70% | 40% |
| A4 | 60% | 80% | 70% | 70% | 60% |
| A5 | 60% | 100% | 80% | 90% | 50% |
| Average | 64% | 80% | 76% | 80% | 46% |

Recovery rates measured ranged from 64% for 6 mesh blue Ti seed particles, 80% for 7 mesh gold Ti seed particles, 76% for 8 mesh blue Ti seed particles, 80% for 8 mesh red Ti seed particles, to 46% for 12 mesh blue Ti seed particles. The highest recovery rate measured by automated inspection was for the 7 mesh gold Ti seed particles whereas the lowest recovery rates were for the 12 mesh blue Ti seed particles.

Figure 7:
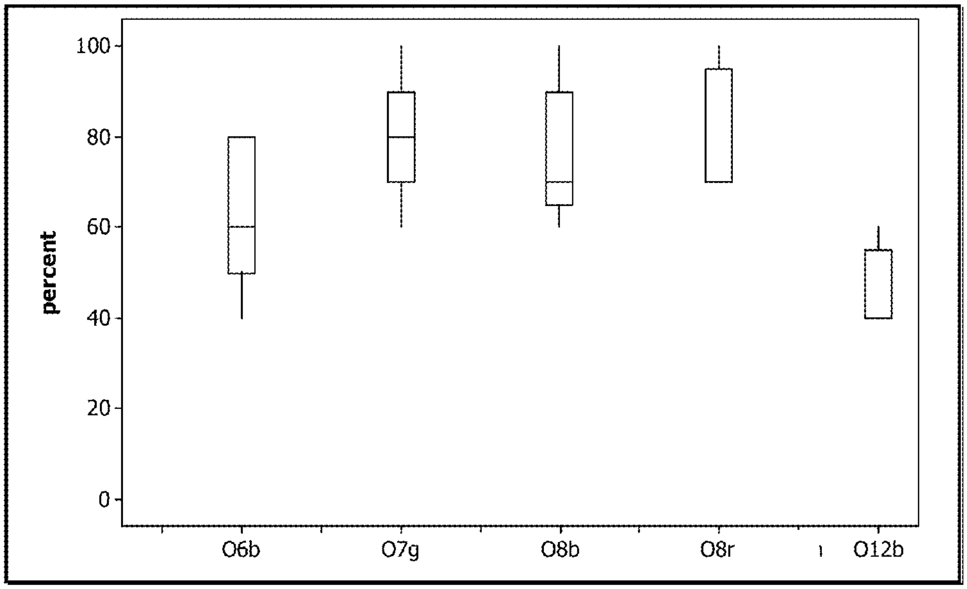
FIG. 7 is a plot comparing the recovery rate of Ti seed particles as a function of size, color and sorting method.

The recovery rates obtained for each class of Ti seed particles are plotted in FIG. 7 to provide a basis for comparison. Within FIG. 7, the label "o" represents the automated sorting system. The numbers 6, 7, 8, and 12 represent 6, 7, 8, and 12 mesh seed particles, respectively, whereas the letters b, g, and r represent blue, gold, and red particles, respectively. Thus, as an example, the label O6b represents the recovery rate obtained for automated inspection of 6 mesh blue Ti seed particles. Within FIG. 7, the vertical bars represent the extent of the entire range of recovery rates achieved for that particular sorting process whereas the vertical boxes represent a 90% confidence level in the data based on a normal distribution of the data. The results provided in Tables 4 and 5 and illustrated in FIG. 7 suggest the viability of using anodized Ti sponge as seed particles to periodically qualify an automated inspecting and sorting system.

The recovery rates of Ti seed particles obtained for automated inspecting processes were also calculated based upon the weight of the Ti seed particles. This was obtained by measuring the total weight of the Ti seed particles added to each batch and then measuring the weight of the recovered Ti seed particles. The weight percent (wt. %) recovery was calculated by dividing the weight of the recovered Ti seed particles by the total weight of all Ti seed particles added and multiplying the result by 100. The results are provided in Table 6 below for the same five batches of Ti particles analyzed in Tables 4 and 5. In Table 6, the batch number is provided at the left whereas "Batch weight" represents the total weight of all Ti particles and Ti seed particles contained within a batch. The "Primary rejects" and "Secondary rejects" respectively represent the weight percent of particles (as a function of the batch weight) which were recovered after completion of the first and second sorting operation performed by the automated inspecting and sorting system. Seed particles were identified by visual overcheck where a UV coating permitted location of these particles by UV light in a darkened room.

TABLE 6

Rejection weights and seed recovery weights

| Batch No. | Batch weight (lb) | Primary rejects (wt. % of total) | Secondary rejects (wt. % of total) | Recovery of Seeds (wt. %) |
|---|---|---|---|---|
| 1 | 3193 | 21.7 | 5.7 | 62.0 |
| 2 | 3093 | 19.2 | 3.7 | 62.9 |
| 3 | 2622 | 19.0 | 3.5 | 75.1 |
| 4 | 3241 | 21.0 | 5.1 | 73.0 |
| 5 | 2695 | 22.1 | 5.1 | 72.3 |
| Average | — | 20.6 | 4.62 | 69.1 |

The results in Table 6 show that the primary rejects amount to 19.0 to 22.1 wt. % of the total batch weight whereas the secondary rejects represent 3.5 to 5.7 wt. % of the total batch weight. Thus, the automated inspecting and sorting system concentrates the detected undesirable particles to an amount representing 3.5 to 5.7 wt. % of the total weight of Ti sponge particles processed. The far right columns in Table 6 provide the wt. % of Ti seed particles recovered by automated sorting of the process stream.

As the above Examples show, by using seed particles to quantify the sorting capability of an automated inspecting and sorting system, the accuracy of the system may be tested and verified. By periodically quantifying their sorting capabilities, the continued proper operation of the sorting system can be verified.

It will be appreciated by persons skilled in the art that the present invention is not limited to what has been particularly shown and described hereinabove. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims and others are equivalent. Furthermore, all references, publications, U.S. patents, and U.S. patent application Publications cited throughout this specification are hereby incorporated by reference as if fully set forth in this specification.

What is claimed is:

1. A method for qualifying an automated system for inspecting and sorting particles, seed particles, and undesirable particles comprising:

forming a conformal surface layer on the particles to produce coated seed particles to impart at least one property with a value or range of values that is the same as or about the same as a value or range of values of a corresponding property of undesirable particles;

calibrating the system to identify or distinguish between particles, seed particles and undesirable particles according to a predetermined property value or range of property values;

introducing a predetermined quantity of the seed particles to a process stream comprising a plurality of particles and undesirable particles;

monitoring the process stream as it is transported along a moving surface;

identifying the seed particles and the undesirable particles in the process stream;

removing the undesirable particles and the seed particles from the process stream;

determining whether the number of seed particles removed is equal to the predetermined quantity of seed particles which were introduced to the process stream; and recalibrating the system to maximize the removal of undesirable particles from the process stream based upon the determining result.

2. The method of claim 1 wherein the surface layer is formed by at least one process selected from the group consisting of anodization, electroplating, chemical vapor deposition physical vapor deposition, and painting.

3. The method of claim 1 wherein the conformal surface layer is formed from a material which does not undesirably influence the properties of articles manufactured using the particles.

4. The method of claim 3 wherein the particles are comprised of Ti sponge, the undesirable particles are comprised of nitrided Ti sponge and the seed particles are comprised of Ti sponge, wherein the surface of the seed particles is coated with a conformal layer of a material having at least one property with a value or range of values that is the same as or about the same as a value or range of values of a corresponding property of nitrided Ti sponge.

5. The method of claim 4 wherein the seed particles are comprised of Ti sponge having a conformal surface layer of titanium oxide formed thereon with the thickness of the titanium oxide layer being adjusted to provide the seed particles with a color or range of colors that is the same or about the same as a corresponding color value or range of color values of nitrided Ti sponge.

6. The method of claim 5 wherein the color value or range of color values of the seed particles is gold, yellow, brown, black, blue, red, violet or shades and/or combinations of these colors.

* * * * *